J. N. RICKARDS.
HUB ATTACHING DEVICE.
APPLICATION FILED SEPT. 17, 1909.

1,002,452.

Patented Sept. 5, 1911.

Witnesses

Inventor
James N. Rickards.
By C. A. Snow & Co.
Attorneys

UNITED STATES PATENT OFFICE.

JAMES NELSON RICKARDS, OF RIDGELY, MARYLAND.

HUB-ATTACHING DEVICE.

1,002,452. Specification of Letters Patent. Patented Sept. 5, 1911.

Original application filed May 6, 1908, Serial No. 431,216. Divided and this application filed September 17, 1909. Serial No. 518,223.

*To all whom it may concern:*

Be it known that I, JAMES NELSON RICKARDS, a citizen of the United States, residing at Ridgely, in the county of Caroline and State of Maryland, have invented a new and useful Hub-Attaching Device, of which the following is a specification.

This invention relates to hub attaching devices and is a division of a patent issued to me on October 12, 1909, No. 936,740.

One of the objects of the invention is to provide simple and efficient means for fastening an axle nut upon the end of an axle after said nut has been adjusted to any desired position, means being provided for positively holding the nut against accidental displacement.

With these and other objects in view the invention consists in certain novel details of construction and the combinations of parts hereinafter more fully described and pointed out in the claim.

In the accompanying drawings the preferred form of the invention has been shown.

Figure 1:
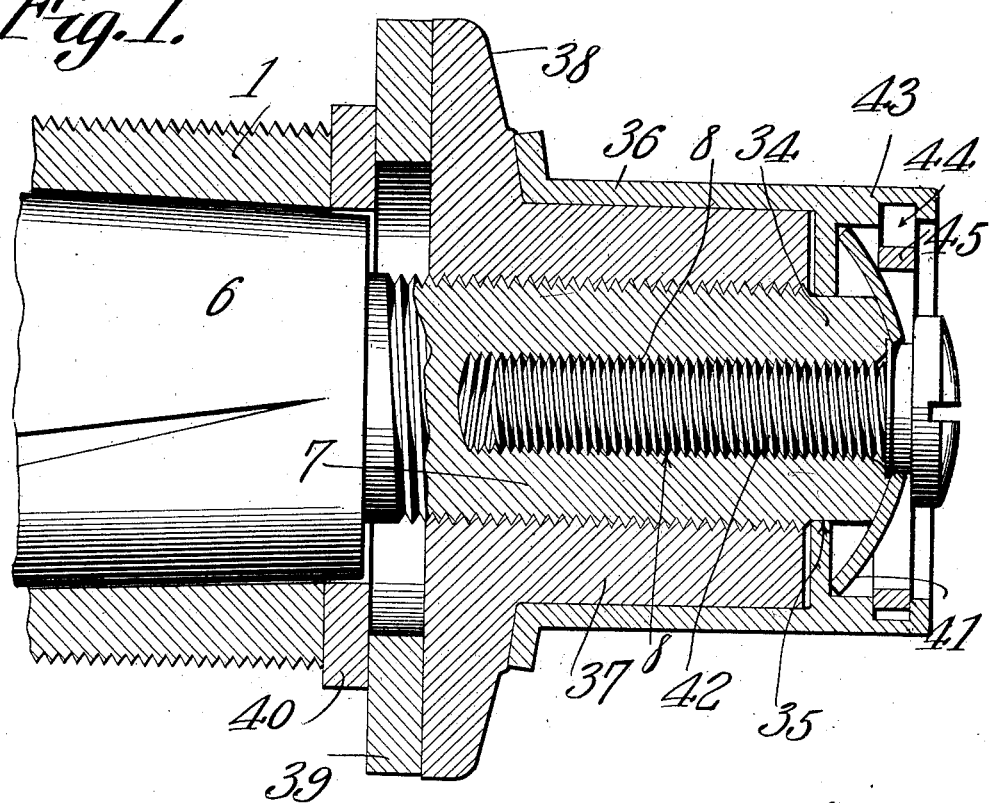
Figures 2, 3:
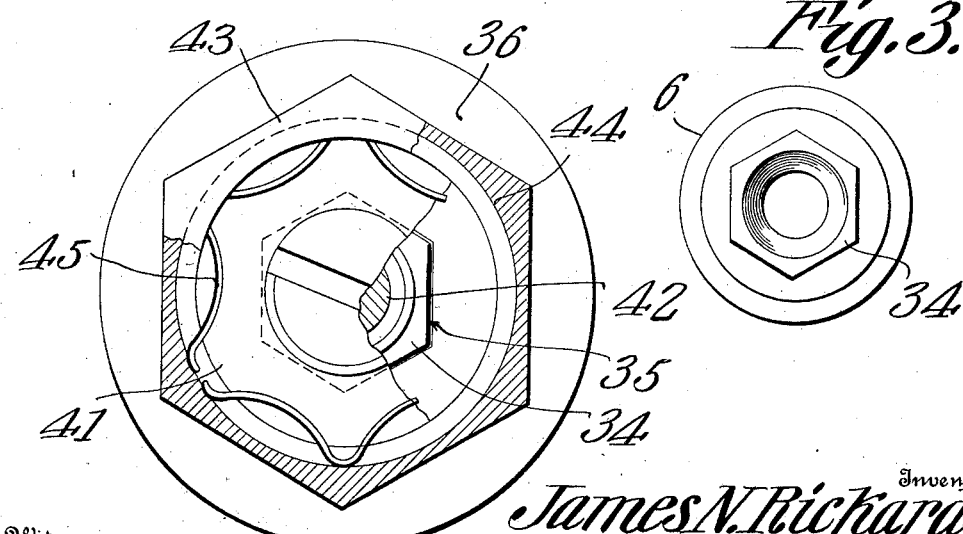

In said drawings:—Figure 1 is a longitudinal section through one end portion of an axle and wheel box having the present improvement applied thereto. Fig. 2 is a view, partly in end elevation and partly in section, of the lock. Fig. 3 is an end elevation of the axle and showing the angular lock engaging head.

Referring to the figures by characters of reference, 1 designates a portion of the tapered box of a wheel hub, the same being of any preferred construction and mounted to rotate upon an axle spindle 6 which is also tapered and is provided at its small end with a longitudinally extending screw threaded recess 8 formed within an exteriorly screw threaded extension 7.

The free end of the threaded extension 7 of the spindle has a polygonal head 34 designed to project into a correspondingly shaped opening 35 formed in one end of a polygonal cap 36. The said cap is adapted to be slid on to an axle nut 37 and, when in position thereon, cannot rotate independently thereof. This nut engages the extension 7 and has an angular flange 38. Washers 39 and 40 may be interposed between this flange and the box 1, as shown in Fig. 1 and may be formed of any suitable material for producing a tight joint between the flange 38 and the adjoining revoluble element. The aperture 35 is arched by a concavo-convex disk or washer 41 in which is swiveled the head portion of a screw 42 projecting into and engaging the wall of the recess 8. A flange 43 extends from the cap 36 and surrounds the washer 41, and the inner face of this flange has an annular groove 44 in which is seated a crimped or waved spring wire 45 which laps the edge of the washer 41 and serves to retain it in position against the cap 36.

When it is desired to secure the box 1 upon the spindle 6, said box is placed over the spindle and the washers 40 and 39 are applied and the nut 37 is screwed onto the extension 7 and against the washer 39. The cap 36 is then placed on the nut 37 and screw 42 turned into the recess 8. The cap 36 is thus slid longitudinally upon the angular nut 37 until the head 34 becomes seated in the opening 35. Independent rotation of the spindle and the cap 36 is thus prevented and inasmuch as the cap fits snugly upon the nut 37 it will be apparent that said nut will also be held against removement. As heretofore stated, the screw 42 is swiveled within the disk or washer 41, and, therefore, by securing the disk within the cap 36, by means of the spring 45, the screw is held against displacement relative to the cap but can be rotated independently thereof.

Although this nut lock or securing means has been shown and described as applied to an axle spindle it is to be understood that it may be used for various other purposes than that of securing a hub upon an axle.

It is of course to be understood that various changes may be made in the construction and arrangement of the parts without departing from the spirit or sacrificing the advantages of the invention.

What is claimed is:—

The combination with an axle having an angular portion at one end, of a polygonal nut screwed upon the axle, a polygonal cap slidably mounted upon the nut and having an angular aperture for the reception of said angular portion on the axle, a disk bearing at its periphery within and against the cap, an axle engaging device swiveled within the disk to hold said disk seated within the cap, there being an interior annular groove within said cap, and a crimped retaining device seated within said groove and lapping the peripheral portion of the disk to hold the disk against displacement relative to the cap.

In testimony that I claim the foregoing as my own, I have hereto affixed my signature in the presence of two witnesses.

JAMES NELSON RICKARDS.

Witnesses:
M. B. LAWTON,
HERBERT D. LAWSON.

Copies of this patent may be obtained for five cents each, by addressing the "Commissioner of Patents, Washington, D. C."